United States Patent
Ko et al.

(10) Patent No.: US 11,603,893 B1
(45) Date of Patent: Mar. 14, 2023

(54) METHOD OF SETTING CLUTCH CONTROL REFERENCE VALUE

(71) Applicants: Hyundai Motor Company, Seoul (KR); Kia Corporation, Seoul (KR)

(72) Inventors: Young Ho Ko, Yongin-si (KR); Chi Hun Cho, Hwaseong-si (KR); Soo Young Kim, Anyang-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 17/741,741

(22) Filed: May 11, 2022

(30) Foreign Application Priority Data

Sep. 10, 2021 (KR) .................. 10-2021-0121055

(51) Int. Cl.
*F16D 48/06* (2006.01)
*F16D 48/08* (2006.01)

(52) U.S. Cl.
CPC .......... *F16D 48/08* (2013.01); *F16D 48/066* (2013.01); *F16D 2500/1026* (2013.01); *F16D 2500/3022* (2013.01); *F16D 2500/3024* (2013.01); *F16D 2500/50245* (2013.01); *F16D 2500/70663* (2013.01)

(58) Field of Classification Search
None
See application file for complete search history.

(56) References Cited

U.S. PATENT DOCUMENTS

| 5,481,187 | A | * | 1/1996 | Marcott | ................ | H01F 7/1844 |
| | | | | | | 324/207.16 |
| 10,801,562 | B2 | | 10/2020 | Ko et al. | | |
| 2010/0004837 | A1 | * | 1/2010 | Connolly | .............. | F16D 48/064 |
| | | | | | | 701/68 |
| 2016/0084327 | A1 | * | 3/2016 | Yoon | ...................... | F16D 48/06 |
| | | | | | | 701/67 |
| 2020/0332845 | A1 | * | 10/2020 | Goossens | .............. | F16D 48/064 |

FOREIGN PATENT DOCUMENTS

| JP | 2016191388 | A | 11/2016 |
| KR | 101267156 | B1 | 5/2013 |
| KR | 20180069946 | A | 6/2018 |
| KR | 101916545 | B1 | 11/2018 |
| KR | 101948647 | B1 | 2/2019 |
| KR | 101999472 | B1 | 7/2019 |
| KR | 20210053407 | A | 5/2021 |

* cited by examiner

*Primary Examiner* — Timothy Hannon
(74) *Attorney, Agent, or Firm* — Morgan, Lewis & Bockius LLP

(57) ABSTRACT

A method of setting a clutch control reference value includes monitoring the pressure of a clutch while a controller applies test current having a predetermined amplitude and frequency to a solenoid valve in the manner of gradually reducing the magnitude of the test current from a predetermined entry value, applying, when the amplitude of the pressure of the clutch starts to change, predetermined checking current, the checking current vertically oscillating based on the magnitude of current when the amplitude of the pressure of the clutch starts to change as a central value, and determining a volumetric kiss point (VKP) by comparing the amplitude of the pressure of the clutch according to application of the checking current with a predetermined reference range.

20 Claims, 5 Drawing Sheets

METHOD OF SETTING CLUTCH CONTROL REFERENCE VALUE

CROSS-REFERENCE TO RELATED APPLICATION

The present application claims priority to Korean Patent Application No. 10-2021-0121055, filed on Sep. 10, 2021, the entire contents of which is incorporated herein for all purposes by this reference.

BACKGROUND OF THE PRESENT DISCLOSURE

Field of the Present Disclosure

The present disclosure relates to technology for setting a control reference value for controlling a hydraulic multi-plate clutch used in a transmission of a vehicle or the like.

Description of Related Art

A transmission of a vehicle is provided with a hydraulic multi-plate clutch, in which a plurality of clutch plates and a plurality of clutch discs are alternately arranged to overlap each other between two rotation bodies and are pressed by a piston, varying the magnitude of power which is transmitted.

Hereinafter, the hydraulic multi-plate clutch will be simply referred to as a "clutch".

Such a clutch is controlled by hydraulic pressure supplied through a solenoid valve. A volumetric kiss point (VKP), which refers to the amount of current which is applied to the solenoid valve when the clutch is changed from a disengaged state and starts to transmit power, is a main control reference value which is used when a controller controls the clutch using the solenoid valve.

Therefore, when manufacturing a transmission, it is desirable to enable a controller to learn and set a VKP as rapidly and accurately as possible, so that the controller can control a clutch based on the accurately set VKP in the state in which the transmission is mounted in a vehicle. Furthermore, it is desirable to enable the controller to update the VKP rapidly and accurately while the vehicle is being driven.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of setting a clutch control reference value, which enables more accurate learning of a VKP of a hydraulic multi-plate clutch, which is controlled by a solenoid valve, improving the accuracy of control of the clutch, and which enables accurate control of a transmission provided with the clutch, improving the gear-shifting quality of a vehicle.

In accordance with various aspects of the present disclosure, the above and other objects may be accomplished by the provision of a method of setting a clutch control reference value, the method including monitoring the pressure of a clutch while a controller is configured to apply test current having a predetermined amplitude and frequency to a solenoid valve in the manner of gradually reducing the magnitude of the test current from a predetermined entry value, applying, when the amplitude of the pressure of the clutch starts to change, predetermined checking current, the checking current vertically oscillating based on the magnitude of current when the amplitude of the pressure of the clutch starts to change as a central value, and determining a volumetric kiss point (VKP) by comparing the amplitude of the pressure of the clutch according to application of the checking current with a predetermined reference range.

The test current may be applied in a form of a triangular wave, the magnitude of which is linearly reduced over time.

When reduction of the amplitude of the pressure of the clutch according to application of the test current to a predetermined reference ratio or lower than the predetermined reference ratio is detected a predetermined reference number of reductions, it may be determined that the amplitude of the pressure of the clutch has started to change, and the average value of the maximum values and the minimum values of current that form the amplitudes of the pressure of the clutch that are reduced may be set as a central value of the checking current.

The checking current may be applied to vertically oscillate based on the central value in a predetermined reference number of oscillations.

The checking current may have the same amplitude as the amplitude of the test current.

In the determining the VKP, if the amplitude of the pressure of the clutch according to application of the checking current is within the predetermined reference range, the average value of the pressure of the clutch according to application of the checking current may be determined as the VKP.

In the determining the VKP, if the average of the amplitudes of a last predetermined reference number of waveforms, among a series of waveforms of the pressure of the clutch according to application of the checking current, is within the predetermined reference range, the average value of the maximum values and the minimum values of the last predetermined reference number of waveforms may be determined as the VKP.

The determining the VKP may be repeated a predetermined reference number of iterations while the determined VKP is stored, and among the VKPs stored the predetermined reference number of iterations, the average value of the VKPs excluding the maximum value and the minimum value may be set as a final VKP.

In the determining the VKP, if the average of the amplitudes of the last predetermined reference number of waveforms, among a series of waveforms of the pressure of the clutch according to application of the checking current, is out of the predetermined reference range, the determining the VKP may be repeated while checking current having a changed central value is applied.

If the average of the amplitudes of the last predetermined reference number of waveforms, among a series of waveforms of the pressure of the clutch according to application of the checking current, is greater than the predetermined reference range, the central value may be reduced by a predetermined subtraction current. If the average of the amplitudes of the last predetermined reference number of waveforms, among a series of waveforms of the pressure of the clutch according to application of the checking current, is less than the predetermined reference range, the central value may be increased by a predetermined addition current.

The absolute value of the subtraction current and the absolute value of the addition current may be set to be different from each other.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
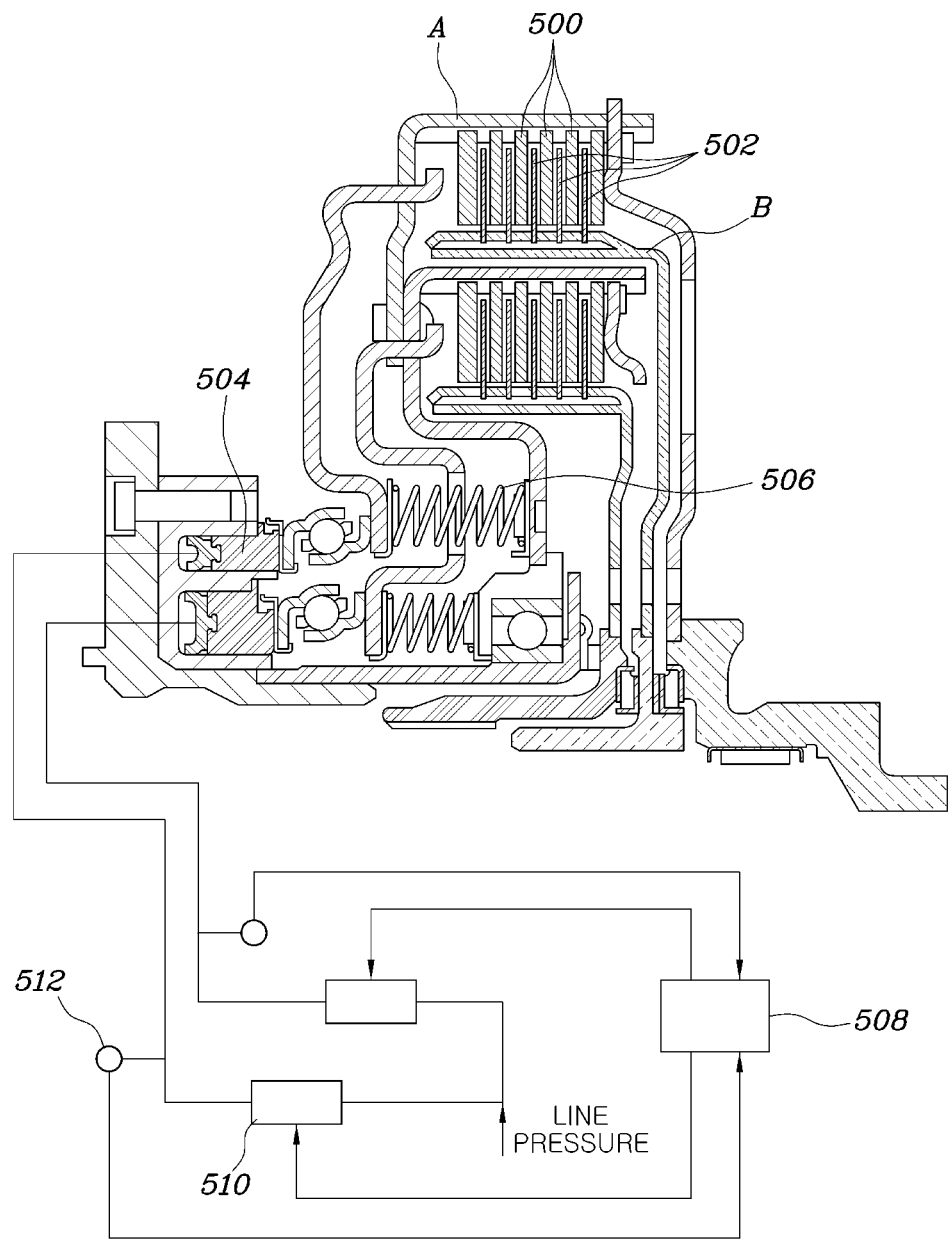
FIG. 1 is a diagram illustrating a control circuit of a hydraulic multi-plate clutch to which an exemplary embodiment of the present disclosure is applicable.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Various exemplary embodiments will now be described more fully with reference to the accompanying drawings, in which only some exemplary embodiments are shown. Specific structural and functional details included herein are merely representative for describing exemplary embodiments of the present disclosure. The present The present disclosure, however, may be embodied in many alternative forms, and should not be construed as being limited to the exemplary embodiments set forth herein.

Accordingly, while exemplary embodiments of the present disclosure are capable of being variously modified and taking alternative forms, embodiments thereof are shown by way of example in the drawings and will herein be described in detail. It should be understood, however, that there is no intent to limit the present disclosure to the exemplary embodiments disclosed. On the other hand, various exemplary embodiments are to cover all modifications, equivalents, and alternatives falling within the scope of the present disclosure.

It will be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of exemplary embodiments of the present disclosure.

It will be understood that when an element is referred to as being "connected" or "coupled" to another element, it may be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for describing various exemplary embodiments only and is not intended to be limiting of exemplary embodiments of the present disclosure. As used herein, the singular forms "a", "an", and "the", are intended to include the plural forms as well, unless the context clearly indicates otherwise. It will be further understood that the terms "comprises", "comprising", "includes", and/or "including", when used herein, specify the presence of stated features, integers, steps, operations, elements, components, or combinations thereof, but do not preclude the presence or addition of one or more other features, integers, steps, operations, elements, components, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

Hereinafter, various exemplary embodiments of the present disclosure will be described in detail with reference to the accompanying drawings. In the drawings, the same reference numerals refer to the same components.

FIG. 1 illustrates a control circuit of a hydraulic multi-plate clutch to which an exemplary embodiment of the present disclosure is applicable. A hydraulic multi-plate clutch is configured so that a plurality of clutch plates 500 and a plurality of clutch discs 502 are alternately disposed to overlap each other between two rotation bodies A and B and so that a piston 504 is provided therein to be movable by hydraulic pressure. When hydraulic pressure is applied to the piston 504, the piston 504 moves to press the clutch plates 500 and the clutch discs 502 to bring the clutch plates 500 and the clutch discs 502, which overlap each other, into close contact with each other, whereby the hydraulic multi-plate clutch enters an engaged state for transmitting power. When the hydraulic pressure applied to the piston 504 is released, the piston 504 is returned to the original position thereof by the elastic force of a spring 506, and the clutch plates 500 and the clutch discs 502 become configured for rotating relative to each other, whereby the hydraulic multi-plate clutch enters a disengaged state.

Referring to FIG. 1, two clutches are provided, and hydraulic pressure is controlled and supplied to each of the clutches. A solenoid valve 510, which is controlled by a controller 508, adjusts a line pressure to thereby supply desired hydraulic pressure to the piston 504 of the clutch. The hydraulic pressure supplied to the piston 504 is measured by a hydraulic pressure detector 512.

Figure 2:
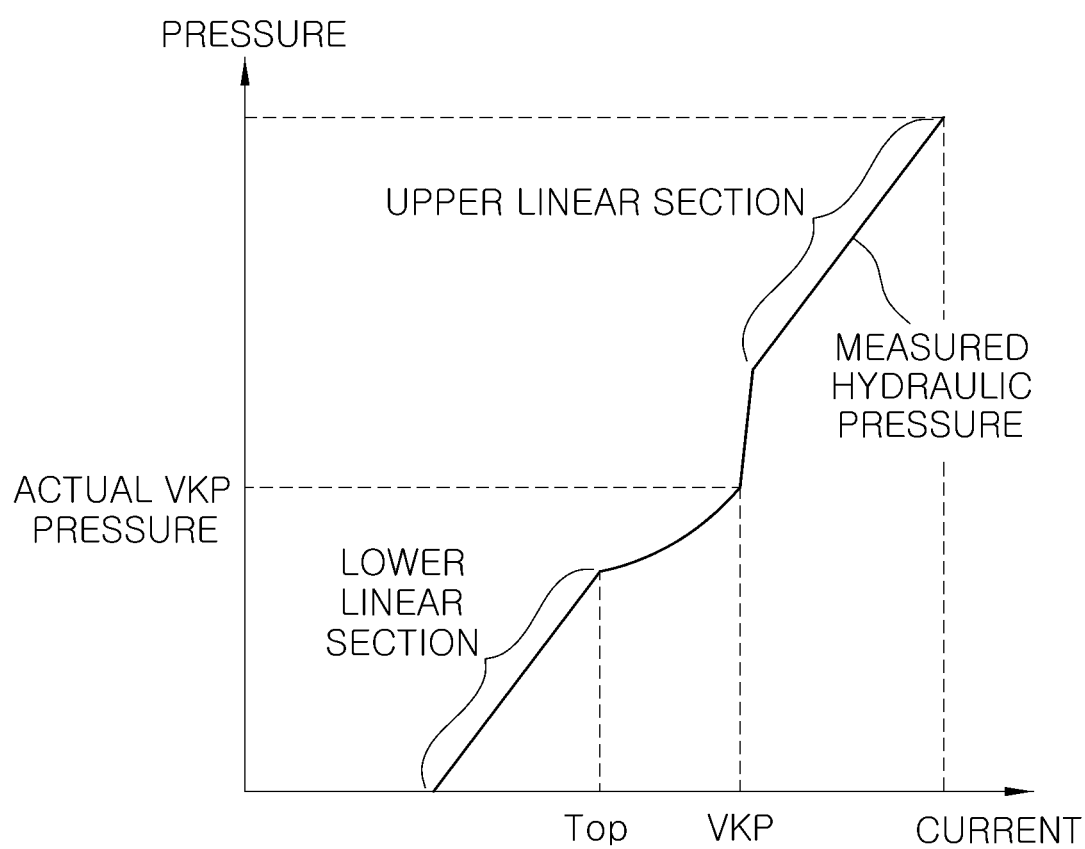
FIG. 2 is a graph showing a change in the pressure of a clutch according to an increase in the magnitude of control current which is applied to a solenoid valve in the control circuit shown in FIG. 1.

As illustrated in FIG. 2, the hydraulic pressure supplied to the clutch under the control of the solenoid valve 510 tends to be linearly proportional to the magnitude of control current applied to the solenoid valve 510 by the controller 508, except for some sections.

The reason why the control current and the hydraulic pressure are not linearly proportional to each other for some sections is mainly caused by the structural and operational characteristics of the clutch.

The operation of the clutch will be described first. When the control current is initially applied to the solenoid valve 510, the spring 506 of the clutch is not compressed. When the magnitude of the control current increases beyond a predetermined level, the piston 504 starts to move while compressing the spring 506.

The clutch plates 500 and the clutch discs 502 are pressed by the movement of the piston 504, and the piston 504 continues to move until frictional force starts to occur between the clutch plates 500 and the clutch discs 502. Thereafter, the pressure between the clutch plates 500 and the clutch discs 502 is increased with the increase in the hydraulic pressure due to the increase in the magnitude of the control current. At the instant time, however, the piston 504 moves to an extent which is substantially insignificant. That is, it may be seen that the piston 504 hardly moves.

In the above-described operational process of the clutch which is performed according to the increase in the magnitude of the control current, the hydraulic pressure applied to the piston 504 of the clutch increases linearly with the increase in the magnitude of the control current at the beginning stage, in which the spring 506 of the clutch is not compressed. The present section corresponds to the "lower linear section" shown in FIG. 2.

Thereafter, as the hydraulic pressure increases, the piston 504 moves and compresses the spring 506. Until the piston 504 becomes substantially incapable of moving further due to close contact between the clutch plates 500 and the clutch discs 502, the volume of the space in the clutch in which the hydraulic pressure acts changes, and accordingly, the hydraulic pressure changes nonlinearly.

In the present way, a section in which the control current and the hydraulic pressure are not linearly proportional to each other is generated.

Thereafter, when the piston 504 becomes substantially incapable of moving further while applying an increasing amount of pressure to the clutch plates 500 and the clutch discs 502, the hydraulic pressure in the clutch again increases linearly according to the increase in the magnitude of the control current. The present section corresponds to the "upper linear section" shown in FIG. 2.

When the movement of the piston 504 is substantially stopped by close contact between the clutch plates 500 and the clutch discs 502, the volume of the space in the clutch in which the hydraulic pressure acts changes no further, and thus the hydraulic pressure again changes linearly. At the present point, transmission of power is substantially realized between the two rotation bodies interconnected by the clutch. The present point is defined as a volumetric kiss point (VKP) or a volumetric touch point (VTP). When controlling the clutch, the VKP is used as a control reference value for controlling the solenoid valve 510.

As illustrated in FIG. 2, the VKP is located between the lower linear section and the upper linear section.

For reference, in FIG. 2, the term "measured hydraulic pressure" refers to the hydraulic pressure measured by the hydraulic pressure detector 512 shown in FIG. 1, and the term "TOP" is an acronym for "take-off point", which refers to the magnitude of current at which the lower linear section ends and the piston starts to move.

Figure 3:
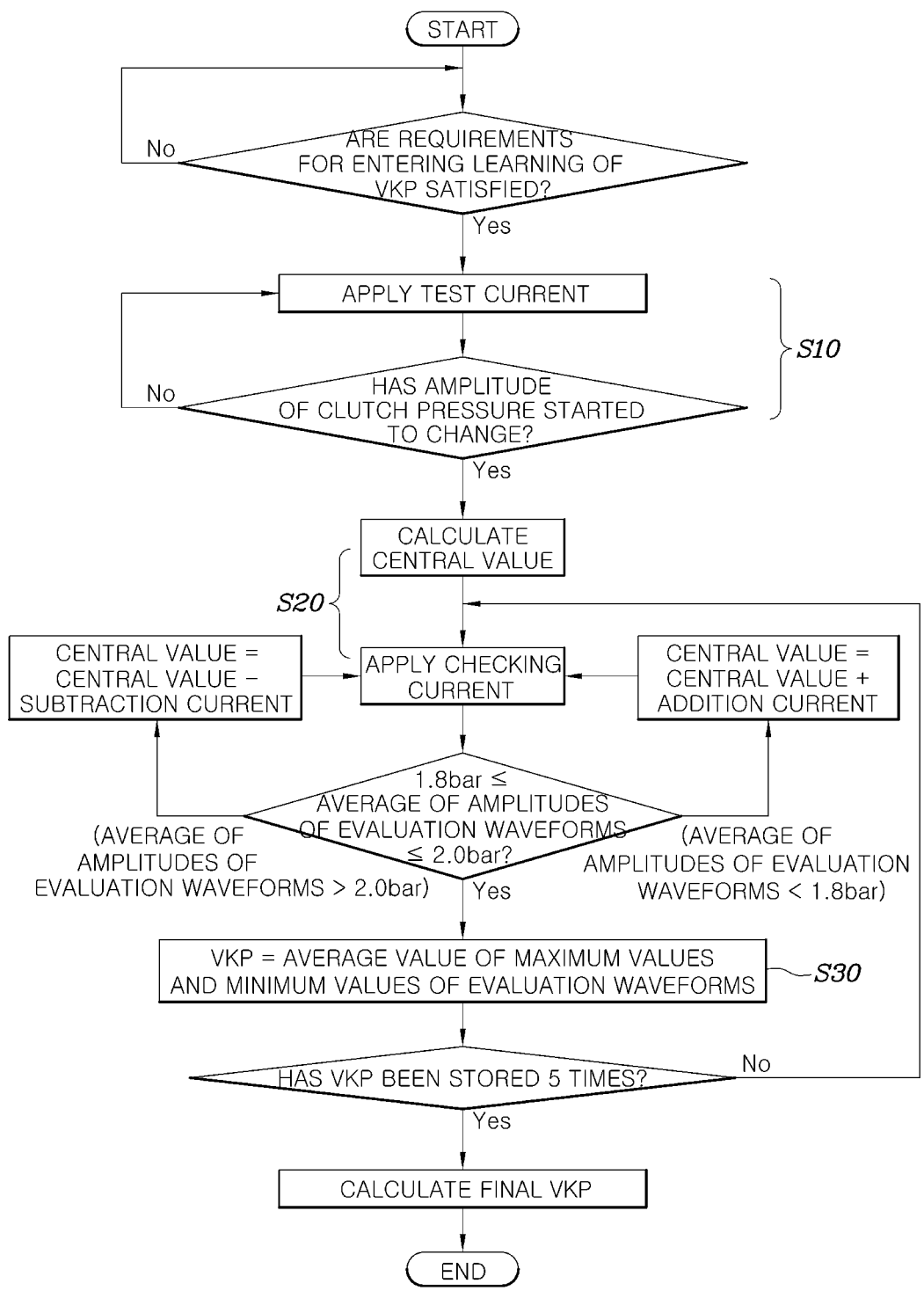
FIG. 3 is a flowchart showing an exemplary embodiment of a method of setting a clutch control reference value according to an exemplary embodiment of the present disclosure.

Referring to FIG. 3, a method of setting a clutch control reference value according to various exemplary embodiments of the present disclosure includes monitoring the pressure of the clutch while the controller applies test current having a predetermined amplitude and frequency to the solenoid valve in the manner of gradually reducing the magnitude of the test current from a predetermined entry value (S10), applying, when the amplitude of the pressure of the clutch starts to change, predetermined checking current, which vertically oscillates based on the magnitude of current when the amplitude of the pressure of the clutch starts to change as a central value (S20), and determining a VKP by comparing the amplitude of the pressure of the clutch according to application of the checking current with a predetermined reference range (S30).

That is, according to an exemplary embodiment of the present disclosure, the controller is configured to apply the test current to the solenoid valve for controlling the clutch and monitors the pressure of the clutch, which changes according thereto. In the meantime, when the amplitude of the pressure of the clutch changes, the controller is configured to apply the checking current, and at the same time compares the amplitude of the pressure of the clutch with the reference range, determining the VKP.

Figure 4:
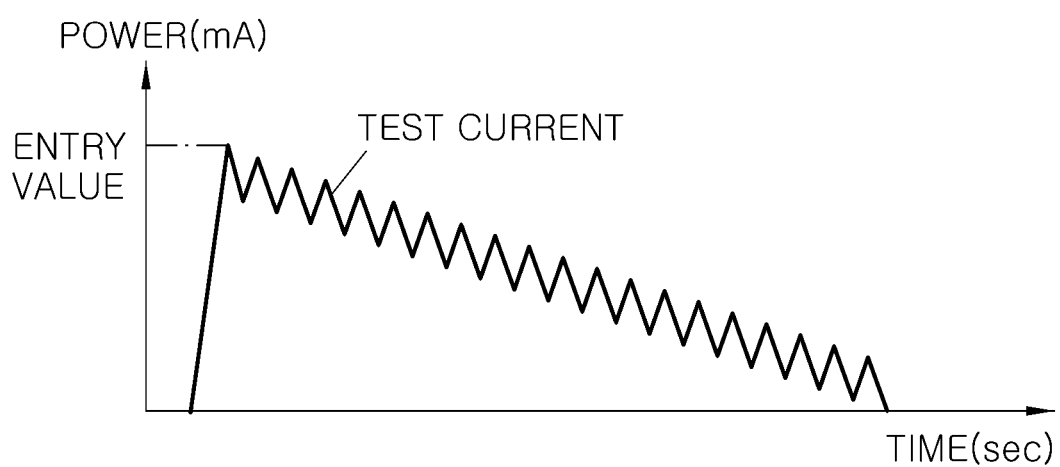
FIG. 4 is a graph showing a change in the pressure of the clutch upon application of test current to the solenoid valve.
Figure 4:
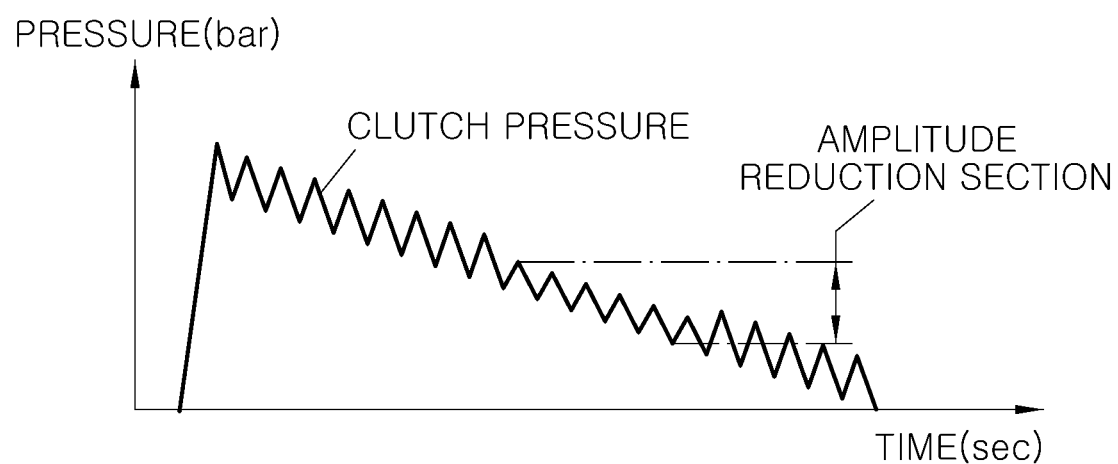

As illustrated in FIG. 4, as the magnitude of the test current is gradually reduced from the entry value, the hydraulic pressure applied to the clutch via the solenoid valve is gradually reduced with constant amplitude, and when the magnitude of the test current comes close to the VKP, the relative amplitude of the hydraulic pressure is reduced due to the damping effect of the hydraulic pressure according to the movement of the piston. The present disclosure utilizes the present phenomenon.

Therefore, the entry value of the test current is a value that can form hydraulic pressure which is much higher than a usual VKP, and may be set to an arbitrary value within the upper linear section, which is located above the VKP. It is desirable to set the entry value of the test current to a value within a range within which the value is sufficiently different from the actual VKP so that the change in the amplitude is securely detected, unless the time taken until the amplitude changes is too long due to the excessive difference.

In the present exemplary embodiment of the present disclosure, the test current is applied in a form of a triangular wave, the magnitude of which is linearly reduced over time, as illustrated in FIG. 4.

Therefore, compared to the case of any other waveform, the amplitude of the test current in the present exemplary embodiment of the present disclosure may be clearly distinguished, and the test current may be changed more rapidly, making it possible to determine the VKP more accurately and rapidly.

When reduction of the amplitude of the pressure of the clutch according to application of the test current to a predetermined reference ratio or lower than the predetermined reference ratio is detected a predetermined reference number of reductions, it is determined that the amplitude of the pressure of the clutch has started to change. The average value of the maximum values and the minimum values of the current that form the amplitudes of the pressure of the clutch that are reduced is set as the central value of the checking current.

For example, the reference ratio may be set to 50%, and the reference number of reductions may be set to two.

Therefore, for example, in the case in which the amplitude of the pressure of the clutch according to application of the test current is initially maintained at 4 bars, when reduction of the amplitude to 2 bars or lower is detected twice, it is determined that the amplitude of the pressure of the clutch has started to change.

Figure 5:
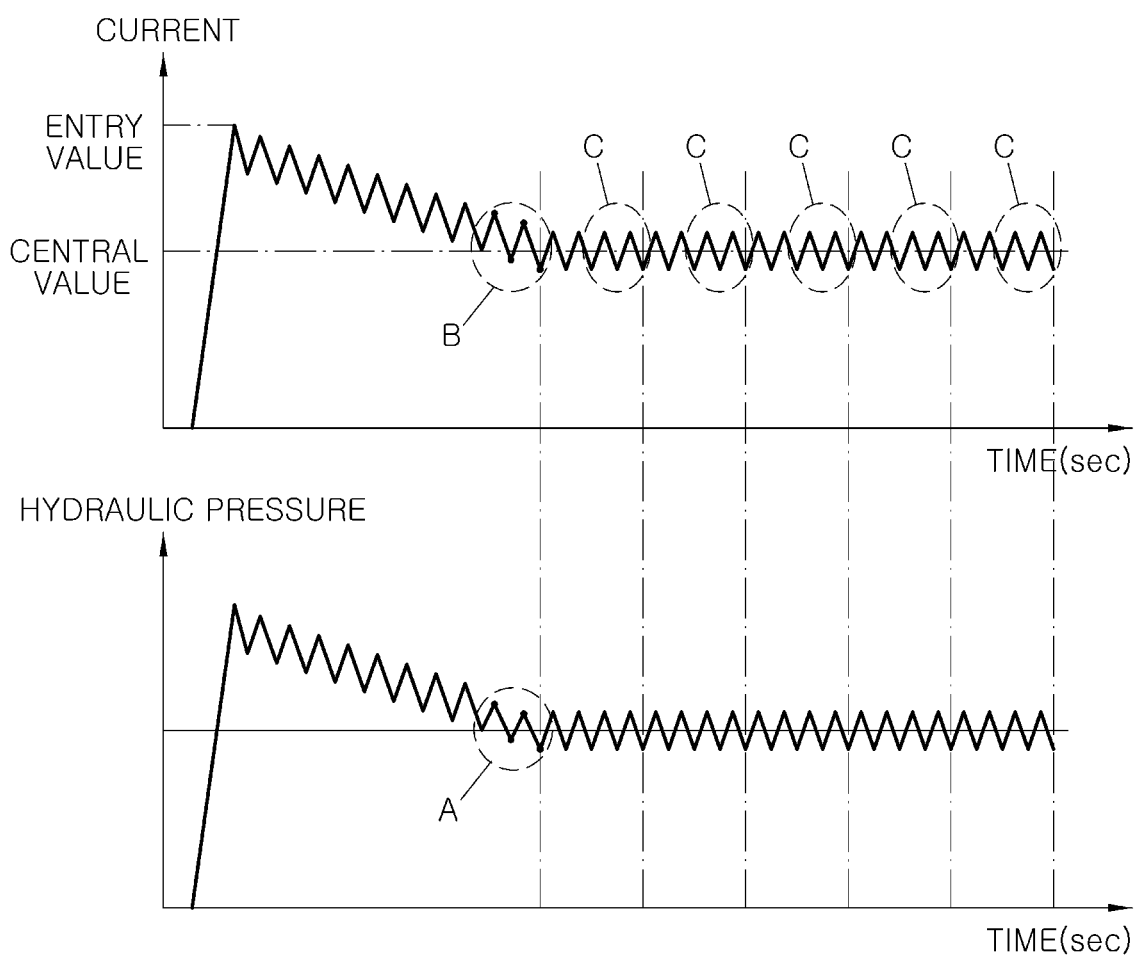
FIG. 5 is a graph showing an exemplary embodiment of the method of setting a clutch control reference value according to an exemplary embodiment of the present disclosure.

Portion A in FIG. 5 illustrates the case in which the amplitude of the pressure of the clutch according to application of the test current, which is initially maintained at 4 bars, is reduced to 2 bars or lower twice.

In the instant case, the average value of the maximum values and the minimum values of the test current that form two waveforms of the pressure of the clutch, reduced to 2 bars or lower, may be set as the central value of the checking current.

That is, the average value of the maximum values and the minimum values of the test current that are shown in portion B in FIG. 5 may be set as the central value of the checking current.

As described above, the reference ratio and the reference number of reductions may be determined through repeated experimentation and analysis so that the point which may be estimated as the VKP is securely determined at the time of appearance of the damping effect of the hydraulic pressure according to the reduction in the magnitude of the test current.

The checking current is applied to vertically oscillate based on the central value in a predetermined reference number of oscillations.

At the present time, a checking current having an amplitude different from the amplitude of the test current may be applied. Alternatively, the checking current may have the same amplitude as that of the test current, so that the amplitude of the checking current is maintained at a constant value at all times, ensuring ease of control and consistency of the change in the pressure of the clutch.

For example, as illustrated in FIG. 5, the reference number of oscillations is set to four. That is, in the state in which the central value is maintained constant, the checking current forms a series of four waveforms that vertically oscillate based on the central value.

In the step of determining the VKP, when the amplitude of the pressure of the clutch according to application of the checking current is within the reference range, the average value of the pressure of the clutch according to application of the checking current may be determined as the VKP.

In the step of determining the VKP, when the average of the amplitudes of the last predetermined reference number of waveforms (hereinafter referred to as "evaluation waveforms"), among a series of waveforms of the pressure of the clutch according to application of the checking current, is within the reference range, the average value of the maximum values and the minimum values of the evaluation waveforms is determined as the VKP.

For example, as shown in FIG. 5, in the case in which the reference number of oscillations of the checking current is set to four, the aforementioned reference number may be set to two. Accordingly, the last two waveforms, among a series of four waveforms of the pressure of the clutch according to application of the checking current, are the evaluation waveforms, and the average of the amplitudes of the evaluation waveforms is compared with the reference range.

For reference, portion C in FIG. 5 indicates the evaluation waveforms.

Among a series of four waveforms of the pressure of the clutch formed by the checking current, a response delay may occur in the initial waveforms, and thus these waveforms are excluded.

For example, the reference range may be set to a range from 1.8 bars to 2.0 bars.

Therefore, among a series of four waveforms of the pressure of the clutch according to application of the checking current, when the average of the amplitudes of the evaluation waveforms is in the range from 1.8 bars to 2.0 bars, the average value of the maximum values and the minimum values of the evaluation waveforms is determined as the VKP.

The VKP obtained as described above may be used as it is. However, in the present exemplary embodiment of the present disclosure, while storing the VPK determined as described above, the step of determining the VKP (S30) is repeated a predetermined reference number of iterations. Among the VKPs stored the reference number of iterations, the average value of the VKPs excluding the maximum value and the minimum value is set as a final VKP. In the present way, it is possible to more accurately set the VKP.

In the present exemplary embodiment of the present disclosure, the reference number of iterations may be set to, for example, five.

Therefore, when the average of the amplitudes of the evaluation waveforms of the pressure of the clutch according to application of the checking current continues to be within the range from 1.8 bars to 2.0 bars, the final VKP is determined after the checking current is applied a total of five times, as shown in FIG. 5.

Referring to FIG. 5, it may be seen that the checking current is applied five times after portion B.

On the other hand, in the step of determining the VKP, when the average of the amplitudes of the last predetermined reference number of waveforms, among a series of waveforms of the pressure of the clutch according to application of the checking current, is out of the reference range, the step of determining the VKP is repeated while checking current having a changed central value is applied.

That is, in the above example, when the average of the amplitudes of the evaluation waveforms is out of the range from 1.8 bars to 2.0 bars, the step of determining the VKP (S30) is repeated while checking current having a changed central value is applied.

If the average of the amplitudes of the evaluation waveforms of the pressure of the clutch according to application of the checking current is out of the reference range, i.e., the range from 1.8 bars to 2.0 bars, this may be interpreted to mean that the VKP is not present within the range of the amplitude of the checking current. Therefore, the process of finding the VKP is performed while the checking current is slightly changed.

If the average of the amplitudes of the last predetermined reference number of waveforms, among the waveforms of the pressure of the clutch according to application of the checking current, is greater than the reference range, the central value is reduced by a predetermined subtraction current.

That is, in the above example, when the average of the amplitudes of the evaluation waveforms is greater than 2.0 bars, the central value of the checking current is reduced by the subtraction current.

For example, the subtraction current may be set to 20 mA.

If the average of the amplitudes of the last predetermined reference number of waveforms, among the waveforms of the pressure of the clutch according to application of the checking current, is less than the reference range, the central value is increased by a predetermined addition current.

That is, in the above example, when the average of the amplitudes of the evaluation waveforms is less than 1.8 bars, the central value of the checking current is increased by the addition current.

For example, the addition current may be set to 10 mA.

As described above, each of the subtraction current and the addition current is configured as unit current by which the central value of the checking current is changed to find the VKP, and may be determined through repeated experimentation and analysis to be set to a level that makes it possible to find the VKP accurately and rapidly.

Furthermore, the absolute value of the subtraction current and the absolute value of the addition current may be set to be different from each other. Accordingly, when the checking current is repeatedly reduced and increased by the subtraction current and the addition current, it is possible to prevent the checking current from repeatedly moving between constant central values, facilitating more rapid and accurate finding of the VKP.

According to an exemplary embodiment of the present disclosure, the VKP is found while applying the test current and the checking current in an oscillating manner as described above, preventing erroneous learning and facilitating more accurate and rapid learning of the VKP even in an abnormal situation in which the solenoid valve is temporarily stuck.

As is apparent from the above description, the present disclosure enables more accurate learning of a VKP of a hydraulic multi-plate clutch, which is controlled by a solenoid valve, improving the accuracy of control of the clutch, and enables accurate control of a transmission provided with the clutch, improving the gear-shifting quality of a vehicle.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of setting a clutch control reference value, the method comprising:
monitoring a pressure of a clutch while a controller applies a test current having a predetermined amplitude and frequency to a solenoid valve by reducing a magnitude of the test current from a predetermined entry value;

applying, when an amplitude of the pressure of the clutch starts to change, a predetermined checking current, the checking current vertically oscillating based on a magnitude of current when the amplitude of the pressure of the clutch starts to change as a central value; and determining a volumetric kiss point (VKP) by comparing the amplitude of the pressure of the clutch according to application of the checking current with a predetermined reference range.

2. The method of claim 1, wherein the test current is applied in a form of a triangular wave, the magnitude of the test current being linearly reduced over time.

3. The method of claim 1, wherein, when reduction of the amplitude of the pressure of the clutch according to application of the test current to a predetermined reference ratio or lower than the predetermined reference ratio is detected by a hydraulic pressure detector a predetermined reference number of reductions, it is determined by the controller that the amplitude of the pressure of the clutch has started to change, and an average value of maximum values and minimum values of a current that form amplitudes of the pressure of the clutch that are reduced is set by the controller as the central value of the checking current.

4. The method of claim 1, wherein the checking current is applied to vertically oscillate based on the central value in a predetermined reference number of oscillations.

5. The method of claim 4, wherein the checking current has a same amplitude as an amplitude of the test current.

6. The method of claim 1, wherein, in the determining the VKP, when the amplitude of the pressure of the clutch according to application of the checking current is within the predetermined reference range, an average value of the pressure of the clutch according to application of the checking current is determined by the controller as the VKP.

7. The method of claim 1, wherein, in the determining the VKP, when an average of amplitudes of a last predetermined reference number of waveforms, among a series of waveforms of the pressure of the clutch according to application of the checking current, is within the predetermined reference range, an average value of maximum values and minimum values of a last reference number of waveforms is determined by the controller as the VKP.

8. The method of claim 7,
wherein the determining the VKP is repeated a predetermined reference number of iterations while the determined VKP is stored by the controller, and
wherein, among VKPs stored the predetermined reference number of iterations, an average value of VKPs excluding a maximum value and a minimum value is set by the controller as a final VKP.

9. The method of claim 8, wherein, in the determining the VKP, when the average of the amplitudes of the last predetermined reference number of waveforms, among the series of waveforms of the pressure of the clutch according to application of the checking current, is out of the predetermined reference range, the determining the VKP is repeated by the controller while a checking current having a changed central value is applied.

10. The method of claim 9, wherein, when the average of the amplitudes of the last predetermined reference number of waveforms, among the series of waveforms of the pressure of the clutch according to application of the checking current, is greater than the predetermined reference range, the central value is reduced by the controller by a predetermined subtraction current, and when the average of the amplitudes of the last predetermined reference number of waveforms, among the series of waveforms of the pressure of the clutch according to application of the checking current, is less than the predetermined reference range, the central value is increased by the controller by a predetermined addition current.

11. The method of claim 10, wherein an absolute value of the predetermined subtraction current and an absolute value of the predetermined addition current are set to be different from each other.

12. A hydraulic multi-plate clutch comprising:
a plurality of clutch plates and a plurality of clutch discs alternately disposed to overlap each;
a piston provided to be movable by hydraulic pressure, wherein when the hydraulic pressure is applied to the piston, the piston moves to press the clutch plates and the clutch discs to bring the clutch plates and the clutch discs, into contact with each other;
a solenoid valve configured to adjust a line pressure to supply the hydraulic pressure to the piston;
a hydraulic pressure detector configured to detect the line pressure;
a controller electrically connected to the solenoid valve and the hydraulic pressure detector, wherein the controller is configured for:
monitoring the line pressure of the solenoid valve while the controller applies a test current having a predetermined amplitude and frequency to the solenoid valve by reducing a magnitude of the test current from a predetermined entry value;
applying, when an amplitude of the line pressure of the clutch starts to change, a predetermined checking current, the checking current vertically oscillating based on a magnitude of current when the amplitude of the line pressure of the clutch starts to change as a central value; and
determining a volumetric kiss point (VKP) by comparing the amplitude of the line pressure of the clutch according to application of the checking current with a predetermined reference range.

13. The hydraulic multi-plate clutch apparatus of claim 12 wherein, when reduction of the amplitude of the line pressure of the clutch according to application of the test current to a predetermined reference ratio or lower than the predetermined reference ratio is detected by the hydraulic pressure detector a predetermined reference number of reductions, the controller is configured to conclude that the amplitude of the line pressure of the clutch has started to change, and to set an average value of maximum values and minimum values of a current that form amplitudes of the line pressure of the clutch that are reduced as the central value of the checking current.

14. The hydraulic multi-plate clutch apparatus of claim 12 wherein the checking current is applied to vertically oscillate based on the central value in a predetermined reference number of oscillations.

15. The hydraulic multi-plate clutch apparatus of claim 12, wherein, in the determining the VKP, when the amplitude of the line pressure of the clutch according to application of the checking current is within the predetermined reference range, an average value of the line pressure of the clutch according to application of the checking current is determined by the controller as the VKP.

16. The hydraulic multi-plate clutch apparatus of claim 12, wherein, in the determining the VKP, when an average of amplitudes of a last predetermined reference number of waveforms, among a series of waveforms of the line pressure of the clutch according to application of the checking current, is within the predetermined reference range, an average value of maximum values and minimum values of a last reference number of waveforms is determined by the controller as the VKP.

17. The hydraulic multi-plate clutch apparatus of claim 16,
wherein the determining the VKP is repeated a predetermined reference number of iterations while the determined VKP is stored by the controller, and
wherein, among VKPs stored the predetermined reference number of iterations, an average value of VKPs excluding a maximum value and a minimum value is set by the controller as a final VKP.

18. The hydraulic multi-plate clutch apparatus of claim 17, wherein, in the determining the VKP, when the average of the amplitudes of the last predetermined reference number of waveforms, among the series of waveforms of the line pressure of the clutch according to application of the checking current, is out of the predetermined reference range, the determining the VKP is repeated by the controller while a checking current having a changed central value is applied.

19. The hydraulic multi-plate clutch apparatus of claim 18, wherein, when the average of the amplitudes of the last predetermined reference number of waveforms, among the series of waveforms of the line pressure of the clutch according to application of the checking current, is greater than the predetermined reference range, the central value is reduced by the controller by a predetermined subtraction current, and when the average of the amplitudes of the last predetermined reference number of waveforms, among the series of waveforms of the line pressure of the clutch according to application of the checking current, is less than the predetermined reference range, the central value is increased by the controller by a predetermined addition current.

20. The hydraulic multi-plate clutch apparatus of claim 19, wherein an absolute value of the predetermined subtraction current and an absolute value of the predetermined addition current are set to be different from each other.

* * * * *